United States Patent [19]

Deaton

[11] Patent Number: 5,652,590
[45] Date of Patent: Jul. 29, 1997

[54] EXPLOITATION OF EMITTER RF AGILITY FOR UNAMBIGUOUS INTERFEROMETER DIRECTION FINDING

[75] Inventor: Robert A. Deaton, Los Angeles, Calif.

[73] Assignee: Hughes Electronics, Los Angeles, Calif.

[21] Appl. No.: 630,400

[22] Filed: Apr. 10, 1996

[51] Int. Cl.$^6$ .................................................. G01S 13/06
[52] U.S. Cl. ........................... 342/156; 342/13; 342/424; 342/442
[58] Field of Search ............................... 342/156, 13, 56, 342/113, 115, 424, 442

[56] References Cited

U.S. PATENT DOCUMENTS

| | | | |
|---|---|---|---|
| 3,935,574 | 1/1976 | Pentheroudakis | 342/424 |
| 5,343,212 | 8/1994 | Rose et al. | 342/424 |
| 5,457,466 | 10/1995 | Rose | 342/442 |
| 5,526,001 | 6/1996 | Rose et al. | 342/442 |
| 5,559,516 | 9/1996 | Didomizio et al. | 342/118 |
| 5,559,517 | 9/1996 | Didomizio et al. | 342/156 |

*Primary Examiner*—John B. Sotomayor
*Attorney, Agent, or Firm*—Leonard A. Alkov; Wanda K. Denson-Low

[57] ABSTRACT

A method for use with a long baseline interferometer that unambiguously estimates the angle of arrival of an RF agile signal produced by an emitter. The angle of arrival estimate provided by the method may be used to resolve phase ambiguities inherent in the long baseline interferometer, thereby providing for the unambiguous estimation of the angle of arrival of the RF signal from the emitter. The RF agile signals processed to determine the phase thereof. The phase information contained in the energy radiated by the emitter is then processed to estimate the angle of arrival of the energy. The phase information contained in the RF agile signal is processed using the equations $\phi = (2\pi f L/c) \sin\theta$, and $\delta \sin\theta = (c/2\pi f L)\delta\phi$, where the phase ($\phi$) is measured to a given error ($\delta\phi$) to determine the direction of arrival ($\theta$) of the energy radiated by the emitter. The angle of arrival of the received RF agile signal from the emitter is estimated by determining the rate at which the phase of the received RF agile signal changes. This provides an independent estimate of angle to the emitter which is used to resolve the ambiguous phase measurements provided by the long baseline interferometer. The angle of arrival of the received RF agile signal from the emitter is estimated using the equation $$\frac{d\phi}{df} = \frac{2\pi L}{c} \sin\theta.$$

The direction of arrival of the energy from the RF agile emitter is selected as the angle derived from processing the phase rate with respect to frequency information, or the angle determined by processing the phase information as resolved by the angle produced by processing the phase slope information.

12 Claims, 1 Drawing Sheet

EXPLOITATION OF EMITTER RF AGILITY FOR UNAMBIGUOUS INTERFEROMETER DIRECTION FINDING

BACKGROUND

The present invention generally relates to RF emitter direction finding methods, and more particularly, to methods that estimate the angle of arrival of an RF agile signal using a long baseline interferometer, and that resolves phase ambiguities to provide for unambiguous angle of arrival estimation from the measured phase.

Heretofore, because measured phase is highly ambiguous, long baseline interferometers have been used to measure the phase rate over time of a received signal. Change in phase rate is used to estimate the location of the RF emitter. An independent angle measurement may be used to estimate the phase ambiguity. However, the accuracy required of the independent measurement is typically impractical to implement.

Therefore, it is an objective of the present invention to provide for a direction finding method that unambiguously estimate the angle of arrival of an RF agile signal using a long baseline interferometer, and resolve phase ambiguities to provide for unambiguous angle of arrival estimation from the measured phase.

SUMMARY OF THE INVENTION

To meet the above and other objectives, the present invention provides for a method for use with a long baseline interferometer that unambiguously estimates the angle of arrival of an RF agile signal produced by an emitter and that is detected by the interferometer. The present invention also provides for a method for using this angle of arrival estimate to resolve phase ambiguities inherent in the long baseline interferometer, thereby providing for the unambiguous estimation of the angle of arrival of the RF signal from the measured phase information.

The angle of arrival of a received RF agile signal from the emitter is estimated using a two element long baseline interferometer by processing phase information derived from the energy radiated by the emitter. The phase information contained in the RF agile signal is processed using the equations $\phi=(2\pi fL/c) \sin \theta$, and $\delta \sin \theta=(c/2\pi fL)\delta\phi$, where the phase ($\phi$) is measured to a given error ($\delta\phi$) to determine the direction of arrival ($\theta$) of the energy radiated by the emitter.

The angle of arrival of the received RF agile signal from the emitter is also estimated by determining the rate at which the phase of the received RF agile signal changes with respect to frequency. This provides an independent estimate of angle to the emitter which is used to resolve the ambiguous phase measurements provided by the long baseline interferometer. The angle of arrival of the received RF agile signal from the emitter is estimated using the equation $$\frac{d\phi}{df} = \frac{2\pi L}{c} \sin \theta.$$

The present invention improves RF agile emitter location capability for radar warning receivers or electronic support measures (ESM) systems that perform phase processing. The present invention may be used with electronic warfare systems, for example, such as those manufactured by the assignee of the present invention.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
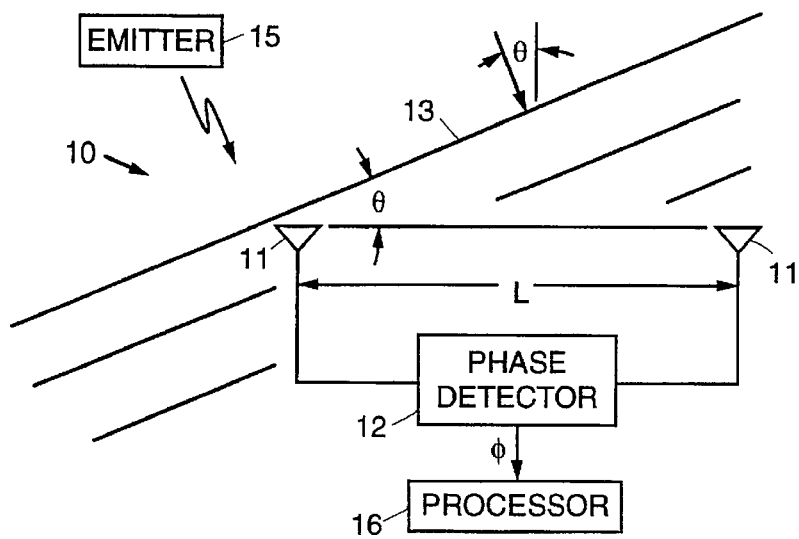
FIG. 1 illustrates an interferometer that is used to generate data that is processed by a direction finding method in accordance with the principles of the present invention to determine the direction of arrival of an received signal.

Referring to the drawing figures, FIG. 1 illustrates a long baseline interferometer 10 in accordance with the principles of the present invention that generates unambiguous angle of arrival measurement data to determine the direction of arrival of RF energy emitted by an RF emitter 15. The phase and frequency information contained in the RF agile signal is received by two antenna elements 11 of the interferometer 10 and are processed using a phase detector 12 whose phase output is applied to a processor 16. The processor 16 is used to determine the unambiguous angle of arrival direction of the emitter 15. The phase information is processed by a direction finding method 20 in accordance with the principles of the present invention in the processor 16 to provide an unambiguous angle of arrival estimate of the RF agile signal from the RF emitter 15.

The long baseline interferometer 10 provides highly ambiguous phase measurements of received RF signals from which the rate of phase change of the signals is determined by the present method 20 to estimate the relative angular location of the RF emitter 15. The disadvantage in using the long baseline interferometer 10 alone for this purpose lies in the inability to determine phase unambiguously. The present method 20 produces an independent angle of arrival estimate for the energy received from RF agile emitter 15 that is used to resolve the phase ambiguity.

The present method 20 exploits RF agile waveforms to allow unambiguous angle of arrival measurement using the long baseline interferometer 10 shown in FIG. 1. The present method 20 provides an unambiguous angle of arrival of less than 0.01° error using a 40 foot long baseline. This enables location of the RF agile emitter 15 to less than 100 foot CEP (circular error probability) at 40 nautical miles, within 6 degrees of flight arc without the use of a staring receiver.

The relationship between angle of arrival ($\theta$) of a signal derived from the RF emitter 15 and phase ($\phi$) between two elements 11 of the interferometer 10 is shown in FIG. 1, where L is the baseline between elements and f is the frequency of the signal radiated by the RF emitter 15. If the phase ($\phi$) is measured to a given error ($\delta\phi$), the direction of arrival ($\theta$) of the signal derived from the RF emitter 15 and resulting angle error is given by the following equations:

$$\phi=(2\pi fL/c) \sin \theta, \tag{1}$$

and $$\delta \sin \theta=(c/2\pi fL)\delta\phi \tag{2}.$$

Given a baseline length (L) of 40 foot at X-band, for example, with $\sigma\phi$ equal to 15° (0.26 radians) at a 13 dB signal-to-noise ratio, then the angle error, $\sigma\theta$ is equal to 0.006°, on boresight.

An angle measurement of this accuracy enables location of the RF emitter 15 to less than 100 foot CEP at 40 nautical miles. However, as is well known, the measured phase is highly ambiguous. For θ between ±90 degrees, the range of φ given a 40 foot baseline is ±144000 degrees or 400 wavelengths. Phase ambiguities map into angle ambiguities separated by 0.14 degrees (on boresight), or 0.0025 in sine space.

An absolute angle reference is normally impossible without a secondary angle measurement with accuracy to within an ambiguity. Because this secondary measurement is often not practical.

The present method 20 directly obtains a secondary angle reference of the required accuracy by exploiting frequency agile waveforms emitted by the RF emitter 15. Equation 1 shows the relationship between phase and transmit frequency of the RF emitter 15. Differentiating this equation provides a relationship between the phase slope as a function of frequency and angle to the RF emitter 15 which is $$\frac{d\phi}{df} = \frac{2\pi L}{c} \sin\theta.$$

The accuracy necessary to measure this phase/frequency slope may be determined in order to obtain an angle estimate (or direction of arrival) to within one ambiguity, which is determined by the equation:

$$\delta \sin\theta = \frac{c}{2\pi L} \delta\left(\frac{d\phi}{df}\right).$$

For an X-band emitter, for example, the above-stated angle ambiguity spacing maps into a phase/frequency slope of 3.6° per 100 MHz. A 95% probability of choosing the correct ambiguity is obtained by requiring the phase/frequency slope accuracy to be σdφ/df=1.8°/100 Mhz, at X-band.

The following equation shows the relationship between the phase/frequency slope estimate and the single pulse phase error, assuming the phase measurements are distributed uniformly over the frequency range (Δf) of the RF agile emitter 15:

$$\sigma \frac{d\phi}{df} = \frac{\sigma_\phi}{\Delta f} \sqrt{\frac{12}{N+3+2/N}},$$

where N=the number of pulses. If two discrete frequencies are measured, the equation is:

$$\sigma \frac{d\phi}{df} = \frac{\sigma_\phi}{\Delta f} \sqrt{\frac{2}{N}}.$$

The single pulse random phase error at 13 dB is 12.8°. Phase biases are excluded because phase differences with respect to frequency are measured. For a frequency agile RF emitter 15 with a 100 MHz frequency range, the number of pulses required to achieve 1.8°/100 MHz phase/frequency slope accuracy is 600.

For Δf of 100 MHz, the range of φ, given a 40 foot baseline, is 1464° or four wavelengths. If the RF signal is uniformly distributed over the frequency range (Δf), phase is easily trackable through the ambiguities. If two discrete frequencies are measured, the total phase range must be unambiguous, requiring a limit on the baseline length or the frequency range.

Figure 2:
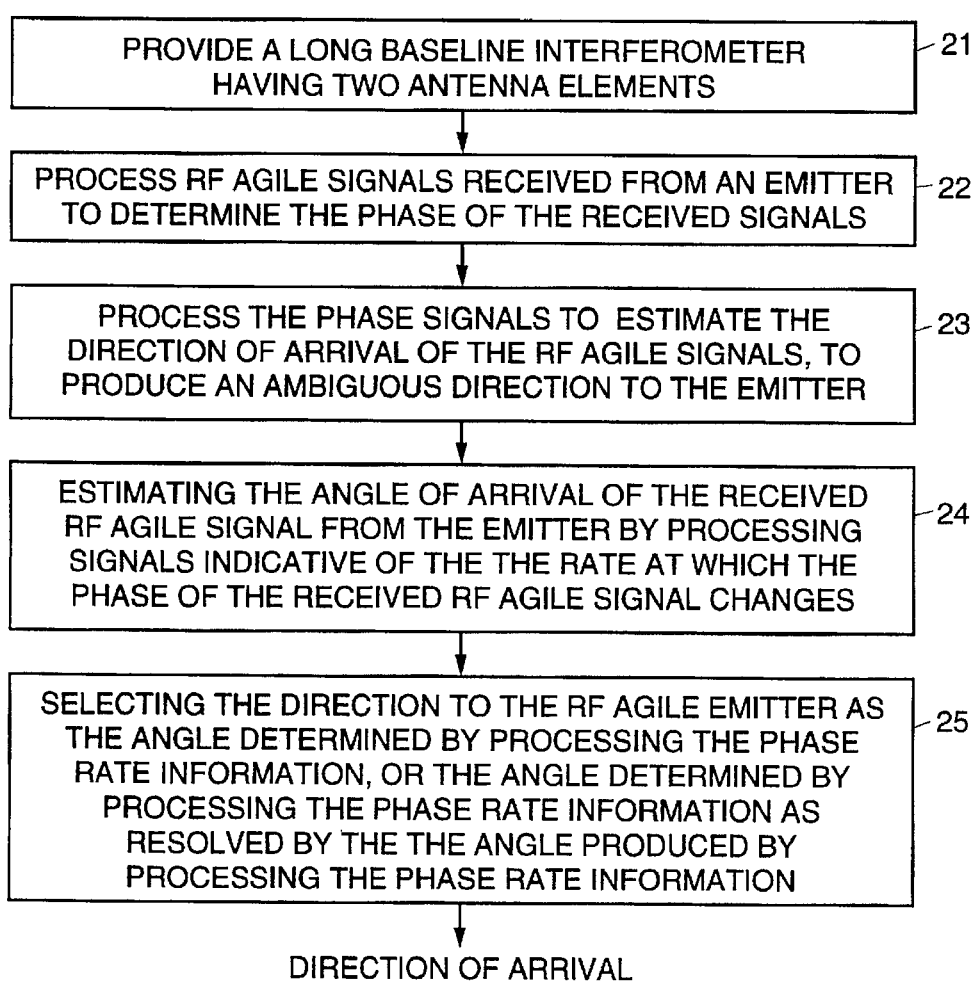
FIG. 2 a flow diagram of a direction finding method in accordance with the principles of the present invention for use with the interferometer of FIG. 1.

For the purposes of completeness, reference is made to FIG. 2, which is a flow diagram of the direction finding method 20 in accordance with the principles of the present invention for use with the interferometer 10 of FIG. 1. The direction finding method 20 determines the direction of arrival of RF energy emitted by an RF agile emitter 15.

The present method 20 comprises the following steps. The first step is to provide 21 a long baseline interferometer 10 having two antenna elements 11. The next step is to process 22 RF agile signals received from the emitter 15 to determine the phase of the received signals. The next step is to process 23 the phase signals to estimate the direction of arrival of the RF agile signals, which produces an ambiguous direction to the emitter 15. The phase information contained in the RF agile signal is processed 23 using the equations φ=(2πfL/c) sin θ, and δ sin θ=(c/2πfL)δφ, where f is the frequency of the energy radiated by the emitter 15, L is the separation between the antenna elements 11 of the interferometer 10, and c is the speed of light, and where the phase (φ) is measured to a given error (δφ) to ambiguously determine the direction of arrival (θ) of the energy radiated by the emitter.

The angle of arrival of the received RF agile signal from the emitter is then estimated 24 by determining the rate at which the phase of the received RF agile signal changes with respect to frequency. This provides an independent estimate of angle to the emitter 15 which is used to resolve the ambiguous phase measurements determined in step 23. The angle of arrival of the received RF agile signal from the emitter is estimated using the equation $$\frac{d\phi}{df} = \frac{2\pi L}{c} \sin\theta.$$

The direction of arrival of the energy from the RF agile emitter 15 and hence the direction to the emitter 15 is selected to be the angle derived from processing 24 the phase slope information, or selected to be the angle determined by processing 23 the phase information as resolved by the angle produced by processing 24 the phase slope information.

Thus, a direction finding method that unambiguously estimate the angle of arrival of an RF agile signal using a long baseline interferometer, and that resolves phase ambiguities to provide for unambiguous angle of arrival estimation from the measured phase have been disclosed. It is to be understood that the described embodiments are merely illustrative of some of the many specific embodiments which represent applications of the principles of the present invention. Clearly, numerous and varied other arrangements may be readily devised by those skilled in the art without departing from the scope of the invention.

What is claimed is:

1. A direction finding method for unambiguously estimating an angle of arrival of an RF agile signal derived from an RF agile emitter, said method comprising the steps of:

providing a long baseline interferometer for receiving RF agile radio frequency signals from the emitter;

processing RF agile signals received from the emitter to determine the phase of the received signals;

processing the phase signals to estimate the direction of arrival of the RF agile signals, which provides an ambiguous direction to the emitter;

estimating the angle of arrival of the received RF agile signal from the emitter by determining the rate at which the phase of the received RF agile signal changes with respect to frequency to provide an independent estimate of angle to the emitter; and selecting the direction of arrival of the energy from the RF agile emitter as the angle derived from processing the phase rate information, or the angle determined by processing the phase rate information as resolved by the angle produced by processing the phase rate information.

2. The method of claim 1 wherein the step of providing a long baseline interferometer comprises the step of providing a two element interferometer having two antenna elements.

3. The method of claim 1 wherein the phase information contained in the RF agile signal is processed using the equations $\phi=(2\pi fL/c) \sin \theta$, and $\delta \sin \theta=(c/2\pi fL)\delta\phi$, where f is the frequency of the energy radiated by the emitter, L is the separation between the antenna elements of the interferometer, c is the speed of light, and where the phase ($\phi$) is measured to a given error ($\delta\phi$) to ambiguously determine the direction of arrival ($\theta$) of the energy radiated by the emitter.

4. The method of claim 1 wherein the angle of arrival of the received RF agile signal from the emitter is estimated using the equation $$\frac{d\phi}{df} = \frac{2\pi L}{c} \sin \theta.$$

5. A direction finding method for unambiguously estimating an angle of arrival of an RF agile signal derived from an RF agile emitter, said method comprising the steps of:
providing a long baseline interferometer 10 for receiving RF agile radio frequency signals from the emitter;
processing RF agile signals received from the emitter to determine the phase of the received signals;
processing the phase signals to estimate the direction of arrival of the RF agile signals, which provides an ambiguous direction to the emitter;
estimating the angle of arrival of the received RF agile signal from the emitter by determining the rate at which the phase of the received RF agile signal changes with respect to frequency to provide an independent estimate of angle to the emitter; and
selecting the direction of arrival of the energy from the RF agile emitter as the angle derived from processing the phase slope information.

6. The method of claim 5 wherein the step of providing a long baseline interferometer comprises the step of providing a two element interferometer having two antenna elements.

7. The method of claim 5 wherein the phase information contained in the RF agile signal is processed using the equations $\phi=(2\pi fL/c) \sin \theta$, and $\delta \sin \theta=(c/2\pi fL)\delta\phi$, where f is the frequency of the energy radiated by the emitter, L is the separation between the antenna elements of the interferometer, c is the speed of light, and where the phase ($\phi$) is measured to a given error ($\delta\phi$) to ambiguously determine the direction of arrival ($\theta$) of the energy radiated by the emitter.

8. The method of claim 5 wherein the angle of arrival of the received RF agile signal from the emitter is estimated using the equation $$\frac{d\phi}{df} = \frac{2\pi L}{c} \sin \theta.$$

9. A direction finding method for unambiguously estimating an angle of arrival of an RF agile signal derived from an RF agile emitter, said method comprising the steps of:
providing a long baseline interferometer for receiving RF agile radio frequency signals from the emitter;
processing RF agile signals received from the emitter to determine the phase of the received signals;
processing the phase signals to estimate the direction of arrival of the RF agile signals, which provides an ambiguous direction to the emitter;
estimating the angle of arrival of the received RF agile signal from the emitter by determining the rate at which the phase of the received RF agile signal changes with respect to frequency to provide an independent estimate of angle to the emitter; and
selecting the direction of arrival of the energy from the RF agile emitter as the angle determined by processing the phase rate information as resolved by the angle produced by processing the phase slope information.

10. The method of claim 9 wherein the step of providing a long baseline interferometer comprises the step of providing a two element interferometer having two antenna elements.

11. The method of claim 9 wherein the phase information contained in the RF agile signal is processed using the equations $\phi=(2\pi fL/c) \sin \theta$, and $\delta \sin \theta=(c/2\pi fL)\delta\phi$, where f is the frequency of the energy radiated by the emitter, L is the separation between the antenna elements of the interferometer, c is the speed of light, and where the phase ($\phi$) is measured to a given error ($\delta\phi$) to ambiguously determine the direction of arrival ($\theta$) of the energy radiated by the emitter.

12. The method of claim 9 wherein the angle of arrival of the received RF agile signal from the emitter is estimated using the equation $$\frac{d\phi}{df} = \frac{2\pi L}{c} \sin \theta.$$

* * * * *